United States Patent
Ogata

(10) Patent No.: US 9,837,650 B2
(45) Date of Patent: Dec. 5, 2017

(54) POROUS MEMBRANE

(71) Applicant: Sumitomo Chemical Company, Limited, Tokyo (JP)

(72) Inventor: Toshihiko Ogata, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/787,904

(22) PCT Filed: Jul. 2, 2015

(86) PCT No.: PCT/JP2015/069107
§ 371 (c)(1),
(2) Date: Oct. 29, 2015

(87) PCT Pub. No.: WO2016/017365
PCT Pub. Date: Feb. 4, 2016

(65) Prior Publication Data
US 2017/0162846 A1    Jun. 8, 2017

(30) Foreign Application Priority Data

Jul. 29, 2014 (JP) ................................ 2014-153623

(51) Int. Cl.
*H01M 2/16* (2006.01)
*H01M 10/0525* (2010.01)

(52) U.S. Cl.
CPC ......... *H01M 2/166* (2013.01); *H01M 2/1686* (2013.01); *H01M 10/0525* (2013.01)

(58) Field of Classification Search
CPC . H01M 2/166; H01M 2/1686; H01M 10/0525
See application file for complete search history.

(56) References Cited

U.S. PATENT DOCUMENTS

| | | | |
|---|---|---|---|
| 6,478,829 B1 | 11/2002 | Zguris | |
| 2007/0231700 A1 | 10/2007 | Watanabe | |
| 2008/0008932 A1 | 1/2008 | Kasamatsu | |
| 2010/0221965 A1 | 9/2010 | Katayama et al. | |
| 2010/0285348 A1 | 11/2010 | Murata et al. | |
| 2011/0229750 A1* | 9/2011 | McLellan | H01M 2/162 429/144 |
| 2012/0129034 A1 | 5/2012 | Hasegawa et al. | |
| 2012/0328929 A1 | 12/2012 | Matsumoto et al. | |
| 2013/0244080 A1 | 9/2013 | Song et al. | |
| 2013/0330590 A1 | 12/2013 | Toyoda | |
| 2014/0023908 A1 | 1/2014 | Ueki et al. | |

FOREIGN PATENT DOCUMENTS

| | | |
|---|---|---|
| JP | 2007227231 A | 9/2007 |
| JP | 2007273123 A | 10/2007 |
| JP | 2008016238 A | 1/2008 |
| JP | 2008186721 A | 8/2008 |
| JP | 2010027553 A | 2/2010 |
| JP | 2011076748 A | 4/2011 |
| JP | 2013197100 A | 9/2013 |
| JP | 2013251205 A | 12/2013 |
| JP | 2014040580 A | 3/2014 |
| JP | 2014091071 A | 5/2014 |
| JP | 5835211 B2 | 12/2015 |
| KR | 20100087061 A | 8/2010 |
| WO | 2009096451 A1 | 8/2009 |
| WO | 2011129169 A1 | 10/2011 |
| WO | 2012099149 A1 | 7/2012 |
| WO | 2012131883 A1 | 10/2012 |

OTHER PUBLICATIONS

Machine translation of JP 2014040580A.*
Office Action dated Dec. 8, 2015 in JP Application No. 2014153623.
Written Opinion dated Sep. 1, 2015 in International Application No. PCT/JP2015/069107.

* cited by examiner

*Primary Examiner* — Stewart Fraser
(74) *Attorney, Agent, or Firm* — Panitch Schwarze Belisario & Nadel LLP

(57) ABSTRACT

A porous membrane is provided having a compound having an ionic group and a hydrophobic group, a metal oxide, and a binder resin. The content of the compound having an ionic group and a hydrophobic group is 0.2 to 2 parts by mass relative to 100 parts by mass of the metal oxide.

12 Claims, No Drawings

POROUS MEMBRANE

CROSS-REFERENCE TO RELATED APPLICATION

This application is a Section 371 of International Application No. PCT/JP2015/069107, filed Jul. 2, 2015, not yet published, and the disclosure of which is incorporated herein by reference.

TECHNICAL FIELD

The present invention relates to a porous membrane.

BACKGROUND ART

Non-aqueous electrolyte secondary batteries such as a lithium ion secondary battery are widely used as batteries for use in personal computers, cellular phones, portable information terminals and so on.

In a non-aqueous electrolyte secondary battery, a separator is generally used as a member for separating a positive electrode and a negative electrode. Conventionally, a porous membrane formed of polyolefin have been used as a separator, there is a problem that heat resistance is not satisfactory.

As a separator having excellent heat resistance, for example, Patent Document 1 proposes a separator having a porous membrane formed of a metal oxide and polyvinyl alcohol.

PRIOR ART DOCUMENTS

Patent Documents

Patent Document 1: JP-A-2008-186721

SUMMARY OF THE INVENTION

Problems to be Solved by the Invention

The separator having a porous membrane containing metal oxide, which has high moisture absorbency and a high moisture content, can deteriorate the battery characteristics of a non-aqueous electrolyte secondary battery comprising the separator.

Means for Solving the Problems

The present invention includes the following aspects.
[1] A porous membrane comprising a compound having an ionic group and a hydrophobic group, a metal oxide, and a binder resin,
wherein the content of the compound having an ionic group and a hydrophobic group is 0.2 to 2 parts by mass with respect to 100 parts by mass of the metal oxide.
[2] The porous membrane according to [1], wherein the SP value of the compound having an ionic group and a hydrophobic group is 13 $(cal/cm^3)^{1/2}$ or less.
[3] The porous membrane according to [1] or [2], wherein the ionic group is an anionic group.
[4] The porous membrane according to any one of [1] to [3], wherein the hydrophobic group is a hydrocarbon group, a group containing a fluorocarbon group, or a group containing silicon.
[5] The porous membrane according to [4], wherein the fluorocarbon group is a fluoroalkyl group.
[6] The porous membrane according to any one of [1] to [5], wherein the binder resin is a water-soluble resin.
[7] The porous membrane according to any one of [1] to [6], wherein the metal oxide is $\alpha$-alumina.
[8] A laminated porous film comprising the porous membrane according to any one of [1] to [7] and another porous membrane that is different from the porous membrane according to anyone of [1] to [7], wherein these are laminated.
[9] An coating liquid comprising a compound having an ionic group and a hydrophobic group, a metal oxide, a binder resin, and a solvent, wherein the content of the compound having an ionic group and a hydrophobic group is 0.2 to 2 parts by mass with respect to 100 parts by mass of the metal oxide.
[10] A non-aqueous electrolyte secondary battery separator comprising the porous membrane according to any one of [1] to [7].
[11] A non-aqueous electrolyte secondary battery comprising the non-aqueous electrolyte secondary battery separator according to [10].
[12] A non-aqueous electrolyte secondary battery separator comprising the laminated porous film according to [8].
[13] A non-aqueous electrolyte secondary battery comprising the non-aqueous electrolyte secondary battery separator according to [12].

Effect of the Invention

According to the present invention, it is possible to obtain a porous membrane containing a metal oxide having a low moisture content.

MODE FOR CARRYING OUT THE INVENTION

<Porous Membrane of Present Invention>

The porous membrane of the present invention (hereinafter also referred to as the present porous membrane) has interconnected fine pores inside. Since the present porous membrane is porous, gas, liquid, ions and so on can permeate from one side to the other side. Also, since the present porous membrane contains a metal oxide, it has high heat resistance and can impart shape stability at high temperatures to a non-aqueous electrolyte secondary battery separator comprising the present porous membrane.

Further, the present porous membrane is a porous membrane having a low moisture content due to including of a compound having an ionic group and a hydrophobic group (hereinafter also referred to as the present compound).

Since a metal oxide generally has high polarity, it strongly interacts with water. Interaction between such a metal oxide and an ionic group possessed by the present compound causes adhesion of the present compound to the surface of the metal oxide, and interaction between the metal oxide and water can be reduced by covering the surface of the metal oxide with hydrophobic groups possessed by the present compound. Accordingly, it is possible to reduce the moisture content of the present porous membrane.

The moisture content of the present porous membrane is preferably less than 0.15% by mass. When the moisture content of the porous membrane is 0.15% by mass or more, the charge-discharge cycle characteristic of a battery may be impaired.

Examples of the ionic group possessed by the present compound include a cationic group, and an anionic group. Preferably, it is an anionic group. Examples of the hydrophobic group include a hydrocarbon group, a group containing a fluorocarbon group, and a group containing silicon, and a group containing a fluorocarbon group is preferred, and among these a group containing a fluoroalkyl group is more preferred. The present compound preferably lacks a nonionic hydrophilic group.

Examples of the cationic group include an alkyl pyridinium group, an ammonium group, and an azolium group.

Examples of the anionic group include a hydroxy group, a carboxy group, a sulfinate group, a sulfenate group, a sulfonate group, a sulfate group, a phosphate group, and a phosphonate group, with the carboxy group, the sulfinate group, the sulfenate group, the sulfonate group, the sulfate group, the phosphate group, and the phosphonate group being preferred. These anionic groups may be in the form of metal salts. Example of a counter cation possessed by such a metal salt include a lithium cation, a sodium cation, a potassium cation, a calcium cation, an aluminum cation and an ammonium cation.

The hydrocarbon group is preferably a hydrocarbon group having 3 to 30 carbon atoms. Examples of the hydrocarbon group having 3 to 30 carbon atoms include a propyl group, an isopropyl group, a butyl group, an isobutyl group, a sec-butyl group, a t-butyl group, a pentyl group, an isopentyl group, a hexyl group, an isohexyl group, a heptyl group, an isoheptyl group, an octyl group, an isooctyl group, a nonyl group, an isononyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group (=eicosyl group), a henicosyl group (=heneicosyl group), a docosyl group, a tricosyl group, a tetracosyl group, a pentacosyl group, a hexacosyl group, a heptacosyl group, an octacosyl group, a nonacosyl group, a triacontyl group, a propenyl group, an allyl group, an isopropenyl group, a butenyl group, an isobutenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, an icosenyl group (=eicosenyl group), a henicosenyl group (=heneicosenyl group), a docosenyl group, a tricosenyl group, a tetracosenyl group, a pentacosenyl group, a hexacosenyl group, a heptacosenyl group, an octacosenyl group, a nonacosenyl group, a triacontenyl group, a propynyl group, a 2-propynyl group, an isopropynyl group, a butynyl group, an isobutynyl group, a pentynyl group, a hexynyl group, a heptynyl group, an octynyl group, a nonynyl group, a decynyl group, an undecenyl group, a dodecenyl group, a tridecenyl group, a tetradecenyl group, a pentadecenyl group, a hexadecenyl group, a heptadecenyl group, an octadecenyl group, a nonadecenyl group, an icosenyl group (=eicosenyl group), a henicosenyl group (=heneicosenyl group), a docosenyl group, a tricosenyl group, a tetracosenyl group, a pentacosenyl group, a hexacosenyl group, a heptacosenyl group, an octacosenyl group, a nonacosenyl group, and a triacontynyl group.

The group containing a fluorocarbon group is preferably a group containing a fluorocarbon group having 3 to 30 carbon atoms. As the group containing a fluorocarbon group having 3 to 30 carbon atoms, a group in which part or all of the hydrogen atoms on the hydrocarbon group have been substituted by fluorine atoms is recited and examples thereof include a perfluoropropyl group, an isoperfluoropropyl group, a perfluorobutyl group, an isoperfluorobutyl group, a sec-perfluorobutyl group, a t-perfluorobutyl group, a perfluoropentyl group, an isoperfluoropentyl group, a perfluorohexyl group, an isoperfluorohexyl group, a perfluoroheptyl group, an isoperfluoroheptyl group, a perfluorooctyl group, an isoperfluorooctyl group, a perfluorononyl group, an isoperfluorononyl group, a perfluorodecyl group, a perfluoroundecyl group, a perfluorododecyl group, a perfluorotridecyl group, a perfluorotetradecyl group, a perfluoropentadecyl group, a perfluorohexadecyl group, a perfluoroheptadecyl group, a perfluorooctadecyl group, a perfluorononadecyl group, a perfluoroicosyl group (=perfluoroeicosyl group), a perfluorohenicosyl group (=perfluoroheneicosyl group), a perfluorodocosyl group, a perfluorotricosyl group, a perfluorotetracosyl group, a perfluoropentacosyl group, a perfluorohexacosyl group, a perfluoroheptacosyl group, a perfluorooctacosyl group, a perfluorononacosyl group, a perfluorotriacontyl group, a perfluoropropenyl group, a perfluoroallyl group, a isoperfluoropropenyl group, a perfluorobutenyl group, an isoperfluorobutenyl group, a perfluoropentenyl group, a perfluorohexenyl group, a perfluoroheptenyl group, a perfluorooctenyl group, a perfluorononenyl group, a perfluorodecenyl group, a perfluoroundecenyl group, a perfluorododecenyl group, a perfluorotridecenyl group, a perfluorotetradecenyl group, a perfluoropentadecenyl group, a perfluorohexadecenyl group, a perfluoroheptadecenyl group, a perfluorooctadecenyl group, a perfluorononadecenyl group, a perfluoroicosenyl group (=perfluoroeicosenyl group), a perfluorohenicosenyl group (=perfluoroheneicosenyl group), a perfluorodocosenyl group, a perfluorotricosenyl group, a perfluorotetracosenyl group, a perfluoropentacosenyl group, a perfluorohexacosenyl group, a perfluoroheptacosenyl group, a perfluorooctacosenyl group, a perfluorononacosenyl group, a perfluorotriacontenyl group, a perfluoropropynyl group, a 2-perfluoropropynyl group, an isoperfluoropropynyl group, a perfluorobutynyl group, an isoperfluorobutynyl group, a perfluoropentynyl group, a perfluorohexynyl group, a perfluoroheptynyl group, a perfluorooctynyl group, a perfluorononynyl group, a perfluorodecenyl group, a perfluoroundecenyl group, perfluorododecenyl group, a tridecenyl group, a tetradecenyl group, a pentadecenyl group, a hexadecenyl group, a heptadecenyl group, a perfluorooctadecenyl group, a perfluorononadecenyl group, a perfluoroicosenyl group (=perfluoroeicosenyl group), a perfluorohenicosenyl group (=perfluoroheneicosenyl group), a perfluorodocosenyl group, a perfluorotricosenyl group, a perfluorotetracosenyl group, a perfluoropentacosenyl group, a perfluorohexacosenyl group, a perfluoroheptacosenyl group, a perfluorooctacosenyl group, a perfluorononacosenyl group, and a perfluorotriacontanyl group.

The hydrocarbon group and the group containing a fluorocarbon group may be coupled with an ether linkage, a thioether linkage, an ester linkage, an amide linkage, or the like.

Examples of the group containing silicon include an alkylsilyl group, a dialkylsilyl group, a trialkylsilyl group, an alkyl siloxane, a dialkyl siloxane, and a trialkyl siloxane.

Examples of the present compound include a cationic compound, an anionic compound, and an amphoteric ion compound. An anionic compound and an amphoteric ion compound are preferred. These compounds are preferred because they tend to have higher affinity with metal oxide. The present compound is preferably a surfactant.

Examples of the cationic present compound include higher amine halogenates, alkylpyridinium halides, and quaternary ammonium salts.

Examples of the anionic present compound include higher fatty acid alkaline salts, polyoxyethylene alkylethersulfonic acid ester salts, polyoxyethylene alkyl ether phosphonic acid salts, alkyl sulfates, alkyl sulfonates, alkylaryl sulfonates, and sulfosuccinic acid ester salts.

Examples of the amphoteric ionic present compound include alkylbetaine compounds, imidazoline compounds, alkylamine oxides, and bisoxyborate compounds.

Also included are compounds in which a hydrogen atom possessed by the present compound is substituted by a fluorine atom, and compounds in which —$CH_2$— is substituted by —O—, —S—, —C(=O)—O—, or —C(=O)—NH—.

The SP value of the present compound is preferably 13 $(cal/cm^3)^{1/2}$ or less, more preferably 11 $(cal/cm^3)^{1/2}$ or less, further preferably 10 $(cal/cm^3)^{1/2}$ or less. Also it is preferably 3 $(cal/cm^3)^{1/2}$ or more, more preferably 5 $(cal/cm^3)^{1/2}$ or more, and further preferably 7 $(cal/cm^3)^{1/2}$ or more.

When the SP value is 13 $(cal/cm^3)^{1/2}$ or less, a porous membrane having a less moisture content tends to be obtained, whereas when the SP value is 3 $(cal/cm^3)^{1/2}$ or more, a porous membrane tends to be easily produced.

The SP value means a solubility parameter, and is used for predicting solubility, permeability, chemical protectability, surface properties and so on of a compound.

Regarding SP values, known numerical values can be used. Regarding those not having a known numerical value, the SP value can be calculated according to Non-Patent Document: Polymer Engineering And Science, 1974, Vol. 14, No. 2, p 147-154. When a combination of two or more present compounds is used, the value obtained by averaging the respective SP values of the compounds by a molar composition ratio is used as a SP value in the present description. When a combination of two or more present compounds is used, and only a mixture thereof is available, the molar composition ratio in the mixture is calculated, for example, by using a high performance liquid chromatography (HPLC), and an average value calculated from the calculated molar composition ratio and the respective SP values of the compounds is regarded as the SP value in the present description.

Concrete examples of the present compound include perfluorooctanesulfonic acid, perfluorocarboxylic acid, (perfluoroalkyl)butylthiopropionic acid, (perfluoroalkyl)ethylthiopropionic acid, perfluoroalkylsulfoneamide propyl trimethyl ammonium, and perfluoroalkykl ammonium, with (perfluoroalkyl)butylthiopropionic acid and (perfluoroalkyl)ethylthiopropionic acid being preferred.

The present compound is commercially available. Examples of the commercially available present compound include Zonyl FSA, Zonyl TBS, Zonyl FSP, Zonyl FSE, Zonyl FSJ, Zonyl UR, and Zonyl NF (available from DuPont).

Examples of the present compound having a SP value of 13 $(cal/cm^3)^{1/2}$ or less include perfluorooctanesulfonic acid, perfluorocarboxylic acid, (perfluoroalkyl)butylthiopropionic acid, and (perfluoroalkyl)ethylthiopropionic acid.

The content of the present compound is 0.2 to 2 parts by mass with respect to 100 parts by mass of the metal oxide. It is preferably 0.3 parts by mass or more, more preferably 0.4 parts by mass or more, and further preferably 0.5 parts by mass or more. It is preferably 1.8 parts by mass or less, more preferably 1.5 parts by mass or less, and further preferably 1.2 parts by mass or less.

When the content of the present compound exceeds 2 parts by mass with respect to 100 parts by mass of the metal oxide, the heat resistance of the present porous membrane tends to be impaired.

<Metal Oxide>

Examples of the metal oxide include talc, clay, kaolin, silica, hydrotalcite, diatomite, calcium oxide, magnesium oxide, titanium oxide, alumina, mica, zeolite, and glass. These may be used singly or in combination of two or more kinds.

The metal oxide may contain other metal components such as metal hydroxide and metal carbonate. The percentage of other metal component contained in the metal oxide is typically 30% by mass or less, preferably 20% by mass or less, more preferably 10% by mass or less, further preferably 5% by mass or less, particularly preferably 1% by mass or less, with respect to the total amount of metal oxide. Among metal oxides, alumina is preferred from the viewpoint of further improving the chemical stability, and the shape stability at high temperatures, and among these α-alumina is more preferred.

The percentage of the metal oxide in the present porous membrane typically exceeds 50% by mass of the present porous membrane, preferably 70% by mass or more, more preferably 90% by mass or more, further preferably 95% by mass or more. It is also preferably 99.5% by mass or less, more preferably 99% by mass or less, further preferably 98% by mass or less.

<Binder Resin>

The binder resin binds metal oxides, and also has the function of binding the present porous membrane, and a porous membrane other than the present porous membrane (hereinafter, also referred to as other porous membrane). The binder resin is preferably a resin that is insoluble to an electrolyte solution of a non-aqueous electrolyte secondary battery, and is electrochemically stable within the use range of the non-aqueous electrolyte secondary battery. Examples of the binder resin include polyolefins such as polyethylene and polypropylene; fluorine-containing resins such as poly(vinylidene fluoride) and polytetrafluoroethylene; fluorine-containing rubbers such as vinylidene fluoride-hexafluoropropylene-tetrafluoroethylene copolymer and ethylene-tetrafluoroethylene copolymer; styrene-butadiene copolymer and hydride thereof; (meth)acrylate ester copolymers such as methacrylate ester copolymer, acrylonitrile-acrylate ester copolymer, and styrene-acrylate ester copolymer; rubbers such as ethylene-propylene rubber; polyvinyl acetate; resins having a melting point or a glass transition temperature of 180° C. or higher such as polyphenylene ether, polysulfone, polyether sulfone, poly phenylene sulfide, polyether-imide, polyamide, polyimide, polyamide-imide, polyether amide, polyester, aromatic polyester, and polyetherether ketone; polycarbonate; polyacetal; and copolymers of water-soluble resins such as carboxyalkyl cellulose, alkyl cellulose, hydroxyalkyl cellulose, starch, polyvinyl alcohol, sodium alginate, polyethylene glycol, cellulose ether, polyacrylic acid, polyacrylamide, and polymethacrylic acid. Among these, fluorine-containing resins, fluorine-containing rubbers, resins having a melting point or a glass transition temperature of 180° C. or higher and water-soluble resins are preferred. Fluorine-containing resins, fluorine-containing rubbers, resins having a melting point or a glass transition temperature of 180° C. or higher are preferred because they are highly stable in the use range of the nonaqueous electrolyte battery. Water-soluble resins are preferred in terms of the process and the environmental load. Among the water-soluble resins, carboxyalkyl cellulose, alkyl cellulose, hydroxyalkyl cellulose, starch, polyvinyl alcohol, and sodium alginate are preferred, and cellulose ether is more preferred. These binder resins may be used singly or in combination of two or more kinds.

Examples of cellulose ether include carboxymethyl cellulose (CMC), hydroxyethyl cellulose (HEC), carboxyethyl cellulose, methyl cellulose, ethyl cellulose, cyanethyl cellulose, and oxyethyl cellulose. Among these, CMC and HEC that are excellent in chemical and thermal stability are preferred, and CMC is more preferred.

Polyamide is preferably aromatic polyamide, particularly preferably para-directing aromatic polyamide (hereinafter, also referred to as "para-aramid").

Para-aramid is typically obtained by condensation polymerization of para-directing aromatic diamine and para-directing aromatic dicarboxylic halide, and is substantially composed of a repeating unit whose amide bond is bound at a para position or the like orientation position of the aromatic ring (for example, orientation position extending coaxially or parallel in the opposite direction such as 4,4'-biphenylene, 1,5-naphthalene, and 2,6-naphthalene). Examples of para-aramid include para-directing para-aramids and para-aramids having a structure corresponding to a para-directing para-aramid such as poly(paraphenylene terephthalamide), poly(para-benzamide), poly(4,4'-benzanilideterephthalamide), poly(paraphenylene-4,4'-biphenylenedicarboxylic amide), poly(paraphenylene-2,6-naphthalenedicarboxylic amide), poly(2-chloro-paraphenylene terephthalamide), and paraphenylene terephthalamide/2,6-dichloroparaphenylene terephthalamide copolymer.

Polyimide is preferably aromatic polyimide, more preferably wholly aromatic polyimide. Aromatic polyimide is typically produced by condensation polymerization of a dianhydride of an aromatic compound and a diamine. Examples of the dianhydride include pyromellitic dianhydride, 3,3',4,4'-diphenyl sulfone tetracarboxylic dianhydride, 3,3', 4,4'-benzphenone tetracarboxylic dianhydride, 2,2'-bis(3,4-dicarboxyphenyl)hexafluoropropane, and 3,3',4,4'-biphenyl tetracarboxylic dianhydride. Examples of the diamine include oxydianiline, paraphenylene diamine, benzphenonediamine, 3,3'-methylene dianiline, 3,3'-diaminobenzphenone, 3,3'-diaminodiphenylsulfone, and 1,5'-naphthalenediamine.

Polyamideimide is preferably aromatic polyamideimide. Aromatic polyamideimide is typically obtainable by condensation polymerization of an aromatic dicarboxylic acid and an aromatic diisocyanate, or may be obtained by condensation polymerization of an aromatic dianhydride and an aromatic diisocyanate. Examples of the aromatic dicarboxylic acid include isophthalic acid and terephthalic acid. Examples of the aromatic dianhydride include trimellitic anhydride. Examples of the aromatic diisocyanate include 4,4'-diphenylmethane diisocyanate, 2,4-tolylene diisocyanate, 2,6-tolylene diisocyanate, ortho-tolylane diisocyanate, and m-xylene diisocyanate.

The percentage of the metal oxide in the total amount of the binder resin and the metal oxide in the present porous membrane typically exceeds 50% by mass, preferably 70% by mass or more, more preferably 90% by mass or more, further preferably 95% by mass or more. Also it is preferably 99.5% by mass or less, more preferably 99% by mass or less, further preferably 98% by mass or less. When the percentage of the metal oxide falls within the range specified above, the present porous membrane with excellent balance between ion permeability and unlikeliness of powder dropping is obtained. Powder dropping is a phenomenon that the metal oxide peels off from the present porous membrane.

The present porous membrane may contain other ingredient as long as functions of the present porous membrane are not impaired. Examples of the other ingredient include a dispersing agent, a plasticizer, and a pH modifier.

The thickness of the present porous membrane is typically 0.1 to 20 µm, preferably 1 to 10 µm. When the thickness is less than 0.1 µm, heat resistance of the non-aqueous electrolyte secondary battery separator including the present porous membrane tends to be insufficient. For example, in the case of using a laminated porous film in which the present porous membrane and a porous membrane formed of polyolefin are laminated, as a non-aqueous electrolyte secondary battery separator, the separator can contract when the thickness of the present porous membrane is less than 0.1 µm because the separator cannot bear the thermal contraction of the porous membrane formed of polyolefin when heat generation occurs in the non-aqueous electrolyte secondary battery due to an accident or the like. On the other hand, when the thickness exceeds 20 µm, the thickness of the separator is large, and the capacity of the battery can be reduced.

The porosity of the present porous membrane is typically 20 to 80% by volume, preferably 30 to 70% by volume.

When the porosity is less than 20% by volume, the retaining amount of the electrolyte solution can decrease, whereas when the porosity is more than 80% by volume, the heat resistance of the present porous membrane can be impaired. In other words, there is a fear that the current cannot be blocked when the battery severely generates heat.

The pore diameter of pores possessed by the present porous membrane is preferably 3 µm or less, more preferably 1 µm or less from the view point of having excellent ion permeability and preventing entry of particles into the positive electrode or the negative electrode.

The permeability of the present porous membrane is typically represented by air permeability. Air permeability of the present porous membrane is typically 30 to 1000 sec/100 cc, preferably 50 to 800 sec/100 cc.

A mass per unit area of the present porous membrane is typically 4 to 20 $g/m^2$, preferably 5 to 12 $g/m^2$. When the mass per unit area is less than 4 $g/m^2$, the strength can be insufficient, whereas when it is more than 15 $g/m^2$, the thickness of the present porous membrane increases, and the capacity of the battery can be reduced.

<Laminated Porous Film>

While the present porous membrane may be used separately as a non-aqueous electrolyte secondary battery separator, it is preferably used in the form of a laminated porous film in which it is laminated with other porous membrane (hereinafter also referred to as the present laminated porous film), as a non-aqueous electrolyte secondary battery separator. Examples of other porous membrane include paper of viscose rayon, natural cellulose or the like; mixed paper obtained by papering fibers such as cellulose, polyester or the like; electrolytic paper; kraft paper; Manila paper; polyethylene nonwoven fabric, polypropylene nonwoven fabric, polyester nonwoven fabric, glass fiber, porous polyolefin (e.g., porous polyethylene, porous polypropylene), porous polyester, aramid fiber, polybutylene terephthalate nonwoven fabric, para-wholly aromatic polyamide, poly(vinylidene fluoride), tetrafluoroethylene, copolymer of vinylidene fluoride and propylene hexafluoride, nonwoven fabric or porous membrane of fluorine-containing resin such as fluorine rubber or the like; and proton conductive polymer. A porous membrane formed of polyolefin (hereinafter, also referred to as polyolefin membrane) is preferred.

The present laminated porous film may have a polyolefin membrane and a plurality of the present porous membranes, and for example, the present porous membranes may be laminated on both sides of the polyolefin membrane. When the present porous membranes are laminated on both sides of the polyolefin membrane, the present porous membranes may contain different present compounds, metal oxides and binder resins.

The polyolefin membrane imparts a function of shutdown to the present laminated porous film by melting to lose the pores when the battery severely generates heat. Further, since the present porous membrane has heat resistance at high temperatures where shutdown occurs, the present laminated porous film has shape stability even at high temperatures.

The moisture content of the present laminated porous membrane is preferably less than 0.15% by mass. When the moisture content of the porous membrane is 0.15% by mass or more, the charge-discharge cycle characteristic of the battery may be impaired.

The 50% breakdown voltage of the non-aqueous electrolyte secondary battery that includes the present laminated porous film as a non-aqueous electrolyte secondary battery separator is preferably 4.40 V or more. The non-aqueous electrolyte secondary battery has a battery voltage of as large as 4.40 V, and even when the battery capacity is large, abnormal heat generation is suppressed at the time of occurrence of internal short-circuit, or in other words, it has excellent safety for internal short-circuit.

The membrane resistance of the laminated porous film is preferably 0.25 to 5.00 $\Omega \cdot cm^2$ from the view point of battery characteristics (ion permeability, load characteristic). When the membrane resistance is less than 0.25 $\Omega \cdot cm^2$, ion permeability is excellent; however, the risk of occurrence of micro short circuit can increase. When the membrane resistance exceeds 5.00 $\Omega \cdot cm^2$, excellent ion permeability is not obtained, and battery characteristics may be impaired. For increasing the membrane resistance, for example, the thickness of the polyolefin membrane and/or the present porous membrane can be increased, or the porosity thereof can be reduced. For reducing the membrane resistance, the thickness of the polyolefin membrane and/or the present porous membrane can be reduced, or the porosity thereof can be increased.

Thickness of the present laminated porous film is typically 5 to 75 μm, preferably 10 to 50 μm. When the thickness of the laminated porous film is less than 5 μm, the laminated porous film can be easily broken, whereas when it exceeds 75 μm, thickness of the present laminated porous film increases, and the capacity of the battery may be reduced.

The volume per unit area of the present porous membrane contained in the present laminated porous film is typically 0.5 to 20 cc/m², preferably 1 to 10 cc/m² from the view points of stability at the time of heating and battery characteristics. When the volume per unit area is less than 0.5 cc/m², the present laminated porous film may be easily broken under heating, whereas when it exceeds 20 cc/m², the thickness of the present laminated porous film increases and the capacity of the battery may be reduced. When the present porous membranes are laminated on both sides of another porous membrane, the volume per unit area is the total value of both sides.

Air permeability of the present laminated porous film is typically 50 to 2000 sec/100 cc, preferably 70 to 1000 sec/100 cc. When the air permeability exceeds 2000 sec/100 cc, the battery characteristics (ion permeability, load characteristic) may be impaired.

The present laminated porous film may contain porous layers such as an adhesive layer, a protective layer and so on other than the other porous membrane and the present porous membrane as long as the object of the present invention is not impaired.

<Polyolefin Membrane>

Examples of the polyolefin contained in the porous membrane formed of polyolefin include high molecular weight homopolymers or copolymers obtained by polymerizing ethylene, propylene, 1-butene, 4-methyl-1-pentene, 1-hexene or the like. High molecular weight polyethylene is preferred. These polyolefins may be used singly or in combination of two or more kinds.

The molecular weight of the polyolefin is preferably $1 \times 10^5$ to $15 \times 10^6$ by weight average molecular weight from the view point of preventing solution of the polyolefin membrane into the electrolyte solution when the present laminated porous film is used in a non-aqueous electrolyte secondary battery, as a non-aqueous electrolyte secondary battery separator.

The percentage of the polyolefin contained in the polyolefin membrane typically exceeds 50% by volume, preferably 70% by volume or more, more preferably 90% by volume or more, further preferably 95% by volume or more of the entire solids contained in the polyolefin membrane.

The polyolefin membrane may contain other ingredient than polyolefin as long as the function of the polyolefin membrane is not impaired.

The thickness of the polyolefin membrane is typically 4 to 50 μm, preferably 5 to 30 μm. When the thickness is less than 4 μm, the strength of the present laminated porous film can be insufficient, whereas when it is more than 50 μm, the thickness of the present laminated porous film increases, and the capacity of the battery may be reduced.

The porosity of the polyolefin membrane is typically 20 to 80% by volume, preferably 30 to 70% by volume.

When the porosity is less than 20% by volume, the retaining amount of the electrolyte solution can decrease, whereas when the porosity is more than 80% by volume, lost of pores at high temperatures where shutdown occurs may be insufficient, or in other words, there is a fear that the current cannot be blocked when the battery severely generates heat.

The pore diameter of pores possessed by the polyolefin membrane is preferably 3 μm or less, more preferably 1 μm or less from the view point of having excellent ion permeability and preventing entry of particles into the positive electrode or the negative electrode when the present laminated porous film is used as a non-aqueous electrolyte secondary battery separator.

The polyolefin membrane has interconnected pores inside, and allows permeation of gas, liquid, ions and so on from one side to the other side. The permeability is typically represented by air permeability. Air permeability of the polyolefin membrane is typically 30 to 1000 sec/100 cc, preferably 50 to 800 sec/100 cc.

The mass per unit area of the polyolefin membrane is typically 4 to 15 g/m², preferably 5 to 12 g/m². When the mass per unit area is less than 4 g/m², the strength of the present laminated porous film may be insufficient, whereas when it is more than 15 g/m², the thickness of the present laminated porous film increases, and the capacity of the battery may be reduced.

<Method for Producing Present Porous Membrane>

As a method for producing the present porous membrane, a method of applying a coating liquid containing the present compound, a metal oxide, and a binder resin (hereinafter also referred to as the present coating liquid) to a base material to form the present porous membrane, and removing the base material to complete the membrane, and a method of applying the present coating liquid on a base material, dipping it in a solvent that mingles with the coating liquid but is not soluble in the binder resin, followed by drying to form a porous membrane, and thereafter removing the base material can be recited.

The present coating liquid typically contains a solvent that dissolves a binder resin. The present coating liquid may contain a pH modifier, a dispersing agent, a plasticizer, alcohol and the like as long as the object of the present invention is not impaired, and preferably contains alcohol.

Examples of the alcohol include methanol, ethanol, 1-propanol, isopropyl alcohol, 2-butanol, tert-butyl alcohol, 1-butanol, isobutyl alcohol, sec-butyl alcohol, t-butyl alcohol, pentyl alcohol, isopentyl alcohol, hexyl alcohol, isohexyl alcohol, heptyl alcohol, isoheptyl alcohol, octyl alcohol, isooctyl alcohol, octyl alcohol, isooctyl alcohol, nonylalcohol, isononylalcohol, decylalcohol, ethyleneglycol, propylene glycol, and butanediol.

The content of the alcohol in the present coating liquid is not particularly limited, and may be such an amount that the property of facilitating application to other porous membrane can be obtained. The content of the alcohol in the present coating liquid is preferably 1 to 1000 parts by mass, more preferably 2 to 500 parts by mass, further preferably 3 to 300 parts by mass, still more preferably 5 to 200 parts by mass based on 1 part by mass of the binder resin.

<Method for Producing Another Porous Membrane>

Another porous membrane may be produced by a known method or a commercially available product may be used.

<Method for Producing Polyolefin Membrane>

As the polyolefin membrane, those produced by forming fine holes by monoaxially or biaxially stretching a film or sheet formed of polyolefin can be used. As a method for producing the polyolefin membrane, for example, a method including forming a film by adding a plasticizer to thermoplastic resin and removing the plasticizer with an appropriate solvent as described in JP-A-7-29563 can be recited. For example, when the polyolefin membrane is formed of a polyolefin resin containing a high molecular weight polyethylene having a weight average molecular weight of more than 1000000, and a low molecular weight polyolefin having a weight average molecular weight of 10000 or less, it is preferably produced by the method including the following steps from the view point of the production cost.

(a) Kneading 100 parts by mass of a high molecular weight polyethylene, 5 to 200 parts by mass of a low molecular weight polyolefin, and 100 to 400 parts by mass of an inorganic filler such as calcium carbonate to obtain a polyolefin resin composition.
(b) Forming a sheet by using the polyolefin resin composition.
(c) Removing the inorganic filler from the sheet obtained in step (b).
(d) Stretching the sheet obtained in step (c) to obtain a polyolefin membrane.

<Method for Producing Present Laminated Porous Film>

As a method for laminating the present porous membrane and another porous membrane, a method of separately producing another porous membrane and the present porous membrane and then laminating them, and a method of applying the present coating liquid to another porous membrane to form the present porous membrane can be recited, and the latter method is preferred for its simplicity.

As the method of applying the present coating liquid to another porous membrane to form the present porous membrane, for example, the method including the following steps can be recited.

(a) Preparing a coating liquid in which metal oxide is dispersed in a solution of the present compound and the binder resin dissolved in a solvent,
(b) Applying the coating liquid to another porous membrane to form a coating membrane,
(c) Depositing the binder resin from the coating membrane by solvent removal or dipping in a solvent that does not dissolve the binder resin, and drying as needed.

When the binder resin is an aromatic polyamide, as the solvent that dissolves the binder resin, polar amide solvents and polar urea solvents can be recited. Concrete examples include N,N-dimethylformamide, N,N-dimethylacetamide, N-methyl-2-pyrrolidone (NMP), and tetramethyl urea.

When the binder resin is a para-aramid, it is preferred to add a chloride of alkali metal or alkali earth metal for the purpose of improving the solubility of the para-aramid in the solvent. Concrete examples include lithium chloride and calcium chloride. The adding amount of the chloride is preferably in the range of 0.5 to 6.0 mol, more preferably in the range of 1.0 to 4.0 mol per 1.0 mol of amide groups in the para-amide. When the chloride is less than 0.5 mol, the solubility of the para-aramid can be insufficient, whereas the chloride exceeding 6.0 mol can be undesired because the solubility of the chloride into the solvent is exceeded. The percentage of the chloride in the total amount of the coating liquid is preferably in the range of 2 to 10% by mass. Generally, when the chloride of alkali metal or alkali earth metal is less than 2% by mass, the solubility of the para-aramid can be insufficient, and when it exceeds 10% by mass, the solubility of the chloride can be insufficient.

As the solvent that dissolves the binder resin when the binder resin is an aromatic polyimide, dimethyl sulfoxide, cresol, o-chlorophenol and the like, besides those exemplified as a solvent that dissolves an aromatic polyamide can be preferably used.

As the solvent that dissolves the binder resin when the binder resin is a water-soluble resin, water, alcohols such as methanol, ethanol and isopropanol, acetone, toluene, xylene, hexane, N-methylpyrrolidone, N,N-dimethylacetamide, and N,N-dimethylformamide can be used singly, or a plurality of these solvents can be mixed as far as they are compatible. Among these, from the view point of process and environmental loads, preferably, water occupies 80% by mass or more of the medium and only water is more preferred.

When the solvent contains water, it is preferred that another porous membrane is subjected to a hydrophilization treatment before the solvent is applied on the other porous member. By subjecting the other porous membrane to the hydrophilization treatment, the coating properties are further improved, and a more uniform present porous membrane can be obtained. This hydrophilization treatment is effective particularly when the concentration of water in the solvent is high.

The hydrophilization treatment of another porous membrane may be conducted in any method, and concrete examples of the method include a treatment with a chemical such as acid or alkali, a corona treatment, and a plasma treatment.

Here, the corona treatment is advantageous in that another porous membrane can be hydrophilized in a relatively short time, and reforming by corona discharge is limited to the surface and the vicinity of another porous membrane, so that high coating properties can be ensured without causing change in the properties of the interior of another porous membrane.

Removal of the solvent from the coating liquid applied on another porous membrane is generally conducted by a method by drying. Also, the coating film before drying may be dipped in a solvent that does not dissolve the binding resin, to deposit the binder resin, and then the solvent may be removed by drying. When the coating liquid is applied on the other porous membrane, the drying temperature of the solvent is preferably such a temperature that does not change the air permeability of the other porous membrane after drying.

The method for applying the present coating liquid on another porous membrane is not particularly limited as far as uniform wet coating is possible, and a conventionally known method can be employed. For example, a capillary coating method, a spin coating method, a slit dye coating method, a spray coating method, a roll coating method, a screen printing method, a flexo printing method, a bar coater method, a gravure coater method, and a dye coater method can be employed. The thickness of the present porous membrane to be formed can be controlled by adjusting the applying amount of the present coating liquid, the concentration of the present coating liquid, and the content ratio between the metal oxide and the binder resin. During the coating, a resin film, a metal belt, or a dram can be used as a support.

As the method for preparing the present coating liquid, a method of stirring by a mechanical stirring method, an ultrasonic dispersing method, a high pressure dispersing method, or a media dispersing method can be recited. The high pressure dispersing method is more preferred because it can disperse the metal oxide more uniformly.

<Non-Aqueous Electrolyte Secondary Battery>

The non-aqueous electrolyte secondary battery comprises a positive electrode, a negative electrode, a non-aqueous electrolyte secondary battery separator sandwiched between the opposing faces of the positive electrode and the negative electrode, and a non-aqueous electrolyte solution.

As the non-aqueous electrolyte solution, for example, a non-aqueous electrolyte solution prepared by dissolving a lithium salt in an organic solvent can be used. The lithium salt can be one or a mixture of two or more of $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lower aliphatic carboxylic acid lithium salt, $LiAlCl_4$ and so on. Among these, those containing at least one selected from the group consisting of fluorine-containing $LiPF_6$, $LiAsF_6$, $LiSbF_6$, $LiBF_4$, $LiCF_3SO_3$, $LiN(CF_3SO_2)_2$, and $LiC(CF_3SO_2)_3$ are preferably used.

Examples of the non-aqueous electrolyte solution include carbonates such as propylene carbonate, ethylene carbonate, dimethyl carbonate, diethyl carbonate, ethylmethyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters such as methyl formate, methyl acetate, and Y-butyrolactone; nitriles such as acetonitrile and butyronitrile; amides such as N,N-dimethylformamide, and N,N-dimethyacetamide; carbamates such as 3-methyl-2-oxazolidon; sulfur-containing compounds such as sulfolane, dimethylsulfoxide, and 1,3-propansultone or the foregoing substances into which a fluorine group is introduced, and typically a mixture of two or more kinds is used.

Among these, those containing carbonates are preferred, and mixtures of cyclic carbonate and non-cyclic carbonate, or mixtures of cyclic carbonate and ethers are more preferred. As the mixtures of cyclic carbonate and non-cyclic carbonate, mixtures containing ethylene carbonate, dimethyl carbonate and ethylmethyl carbonate are preferred in the points that they operate in a wide temperature range, and are refractory even when graphite materials such as natural graphite, artificial graphite and the like are used as an active material of the negative electrode.

As the positive electrode, a collector carrying a mixture of a positive-electrode active material, a conductive agent and a binder is used. A concrete example of the positive-electrode active material that can be used contains a material capable of being doped or undoped with lithium ions, contains a carbonaceous material as the conductive agent, and contains a thermoplastic resin as the binder. As the material capable of being doped or undoped with lithium ions, a lithium composite oxide containing at least one transition metal such as V, Mn, Fe, Co, and Ni can be recited. Among these, a lithium composite oxide having an α-$NaFeO_2$ structure such as lithium nickel oxide and lithium cobalt oxide, a lithium composite oxide having a spinel structure such as lithium manganese spinel are recited in the point that the average discharge potential is high.

The lithium composite oxide may contain various metal elements, and it is preferred to use a composite lithium nickel oxide containing at least one metal element in such an amount that the metal element is 0.1 to 20 mol %, based on the sum of the mol number of at least one metal element selected from the group consisting of Ti, V, Cr, Mn, Fe, Co, Cu, Ag, Mg, Al, Ga, In and Sn, and the mol number of Ni in the lithium nickel oxide, because cycle performance in use with high capacity is improved.

Examples of the binder include polyvinylidene fluoride, copolymer of vinylidene fluoride, polytetrafluoroethylene, tetrafluoroethylene-hexafluoropropylene copolymer, tetrafluoroethylene-perfluoroalkylvinyl ether copolymer, ethylene-tetrafluoroethylene copolymer, vinylidene fluoride-hexafluoropropylene-tetrafluoroethylene copolymer, and thermoplastic resins such as thermoplastic polyimide, polyethylene, and polypropylene.

As the conductive agent, carbonaceous materials such as natural graphite, artificial graphite, cokes, and carbon black can be recited. As the conductive agent, these may be solely used, or for example, a mixture of artificial graphite and carbon black may be used.

As the negative electrode, for example, materials capable of being doped or undoped with lithium ions, lithium metal, lithium alloy and so on can be used. Examples of the materials capable of being doped or undoped with lithium ions include carbonaceous materials such as natural graphite, artificial graphite, cokes, carbon black, pyrocarbons, carbon fiber, a sintered organic polymer compound, and chalcogen compounds of oxides, sulfides and the like doped or undoped with lithium ions at a potential lower than the positive electrode. As the carbonaceous material, carbonaceous materials based on graphite materials such as natural graphite and artificial graphite are referred in the point that they have high potential flatness, and low average discharge potential, and thus large energy density is obtained when combined with the positive electrode.

As the negative electrode collector, Cu, Ni, stainless or the like can be used, and Cu is preferred because it is unlikely to form an alloy with lithium, and can be easily worked into a thin film, particularly in the lithium secondary battery. As a method for making the negative electrode collector carry a mixture containing a negative electrode active material, a pressure forming method, or a method of preparing a paste by using a solvent or the like, and applying the paste on the collector, followed by drying and pressing to make them compression bonded can be recited.

The shape of the battery of the present invention is not particularly limited, and may be any of a paper shape, a coin shape, a cylindrical shape, a rectangular shape or a laminate shape.

EXAMPLES

In the following Examples, Comparative Examples, and Reference Examples, physical properties of a separator were measured according to the following methods.
(1) Dimension retention rate: A laminated porous film was cut into a square shape of 5 cm×5 cm, and a marking line of a square shape of 4 cm square was described in the center, and the film was sandwiched between two sheets of paper, and heated in an oven at 150° C. for 1 hour, then the film was removed and the dimension of the square shape was measured, and dimension retention rate was calculated. The calculating method of dimension retention rate is as follows.
Length of marking line in the vertical direction (TD) before heating: $W1$
Length of marking line in the vertical direction (TD) after heating: $W2$ Dimension retention rate (%) in the vertical direction (TD)=$W2/W1\times100$ (2) Air permeability: Measured according to JIS P8117.
(3) Moisture amount: A laminated porous film was cut into three square shapes of 8 cm×8 cm, and retained for a day under room temperature and a dew point −5° C., and a moisture amount was detected by using a trace quantity moisture meter (CA-200, VA-230, available from Mitsubishi Chemical Analytech Co., Ltd) by heating to 150° C. under the nitrogen gas flow at a flow rate of 200 mL/min. The proportion of the moisture amount to the total weight of the laminated porous film before heating at 150° C. was determined as a moisture content (% by mass). Ratio between the aforementioned moisture content and the moisture content of Comparative Example 1, based on the moisture content of Comparative Example 1 of 100 was determined as a specific moisture content.
(Method for Calculating Molar Composition Ratio of Present Compound)
HPLC measurement was conducted under the following conditions, and a molar composition ratio was calculated from the detected peak area ratio.
HPLC apparatus: Agilent 1260 available from Agilent Technologies
Column: Wakosill-2 IIIC18HG, available from Wako Pure Chemical Industries, Ltd.
Column temperature: 40° C.
Mobile Phase:
  Liquid A: Water (containing 0.1% trifluoroacetic acid)
  Liquid B: Acetonitrile (containing 0.1% trifluoroacetic acid)
  Liquid B concentration: 0 min. (10%)→30 min. (100%)→40 min. (100%)
Flow rate: 0.5 mL/min
Detector: UV (220 nm)
(SP Value of Zonyl FSA)
A SP value of Zonyl FSA (available from DuPont) was determined by conducting HPLC measurement for Zonyl FSA, calculating molar composition ratio of the constituents, and calculating from respective SP values of the constituents calculated according to Polymer Engineering And Science, 1974, Vol. 14, No. 2, p 147-154, and the calculated molar composition ratio. The calculated SP value was 8.7.

Example 1

To a mixture of 100 parts by mass of alumina microparticles (trade name "AKP3000", available from Sumitomo Chemical Co., Ltd.), and 3 parts by mass of carboxymethyl cellulose (Item number 1110, available from DAICEL FINECHEM LTD.), water was added so that the solid content was 29% by mass, and the obtained mixture was stirred and mixed twice in the condition of 2000 rpm, 30 seconds under room temperature by using a planetary centrifugal mixer "Awatori Rentaro" (registered trade name: available from Thinky Corporation). To the obtained mixture, 0.5 parts by mass of Zonyl FSA (available from DuPont, SP value: 8.7) as the present compound, and 14 parts by mass of isopropyl alcohol were added and mixed, to obtain a coating liquid containing 28% by mass of solids. The obtained coating liquid was applied on a porous membrane of polyethylene having subjected to a corona treatment 20 W/(m$^2$/min.) (thickness 12 μm, porosity 41%) by a doctor blade method, and the laminate which was the obtained coated matter was dried at 65° C. for 5 minutes to obtain a laminated porous film (1). An evaluation result of the obtained laminated porous film (1) is shown in Table 1.

Example 2

A laminated porous film (2) was obtained in the same manner as in Example 1 except that Zonyl FSA was varied to 1 part by mass in Example 1. An evaluation result of the obtained laminated porous film (2) is shown in Table 1.

Comparative Example 1

A laminated porous film (3) was obtained in the same manner as in Example 1 except that Zonyl FSA was not added in Example 1. An evaluation result of the obtained laminated porous film (3) is shown in Table 1.

Reference Example 1

A composition was obtained in the same manner as in Example 1 except that Zonyl FSA was 2.5 parts by mass in Example 1. By using the obtained composition, a laminated porous film (4) was obtained in the same manner as in Example 1. An evaluation result of the obtained laminated porous film (4) is shown in Table 1.

TABLE 1

| | Content of present compound (parts by mass) | Specific content (relative to Comparative Example 1 as 100) | Air permeability (sec/100 cc) | Mass per unit area of present porous membrane (g/m$^2$) | Dimension retention rate (%) |
|---|---|---|---|---|---|
| Example 1 | 0.5 | 93 | 234 | 5.2 | 98 |
| Example 2 | 1 | 90 | 236 | 4.9 | 95 |
| Comparative Example 1 | 0 | 100 | 229 | 4.8 | 98 |
| Reference Example 1 | 2.5 | 121 | 277 | 4.7 | 83 |

The specific moisture contents in Examples 1 and 2 decreased by about 10% compared with Comparative Example 1 in which the present compound was not added. The specific moisture content of Reference example 1 in which 2.5 parts by mass of the present compound was added increased by about 20% compared with Comparative Example 1 in which the present compound was not added.

INDUSTRIAL APPLICABILITY

The present invention is useful for obtaining a porous membrane comprising metal oxide having a low moisture content.

The invention claimed is:

1. A porous membrane comprising a compound having an ionic group and a hydrophobic group, a metal oxide, and a binder resin,
wherein the content of the compound having an ionic group and a hydrophobic group is 0.2 to 2 parts by mass with respect to 100 parts by mass of the metal oxide, and wherein a moisture content of the porous membrane is less than 0.15% by mass.

2. The porous membrane according to claim 1, wherein the SP value of the compound having an ionic group and a hydrophobic group is 13 $(cal/cm^3)^{1/2}$ or less.

3. The porous membrane according to claim 1, wherein the ionic group is an anionic group.

4. The porous membrane according to claim 1, wherein the hydrophobic group is a hydrocarbon group, a group containing a fluorocarbon group, or a group containing silicon.

5. The porous membrane according to claim 4, wherein the fluorocarbon group is a fluoroalkyl group.

6. The porous membrane according to claim 1, wherein the binder resin is a water-soluble resin.

7. The porous membrane according to claim 1, wherein the metal oxide is α-alumina.

8. A laminated porous film comprising the porous membrane according to claim 1 and another porous membrane that is different from the porous membrane, wherein these are laminated.

9. A non-aqueous electrolyte secondary battery separator comprising the laminated porous film according to claim 8.

10. A non-aqueous electrolyte secondary battery comprising the non-aqueous electrolyte secondary battery separator according to claim 9.

11. A non-aqueous electrolyte secondary battery separator comprising the porous membrane according to claim 1.

12. A non-aqueous electrolyte secondary battery comprising the non-aqueous electrolyte secondary battery separator according to claim 11.

* * * * *